(12) United States Patent
Scott

(10) Patent No.: US 6,760,442 B1
(45) Date of Patent: Jul. 6, 2004

(54) METHOD AND APPARATUS FOR ADJUSTING THE QUALITY OF DIGITAL MEDIA

(75) Inventor: Glenn C. Scott, Mountain View, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/216,280

(22) Filed: Dec. 18, 1998

(51) Int. Cl.$^7$ ............................................... H04L 9/00
(52) U.S. Cl. ........................................................ 380/268
(58) Field of Search ................................. 380/268, 201

(56) References Cited

U.S. PATENT DOCUMENTS

| | | | | |
|---|---|---|---|---|
| 3,784,743 A | * | 1/1974 | Schroeder ..................... | 178/22 |
| 5,150,432 A | * | 9/1992 | Ueno et al. ................... | 382/56 |
| 5,185,794 A | * | 2/1993 | Thompson et al. ........... | 380/17 |
| 5,535,275 A | * | 7/1996 | Sugisaki et al. .............. | 380/10 |
| 5,600,721 A | * | 2/1997 | Kitazato ................... | 348/420.1 |
| 6,021,199 A | * | 2/2000 | Ishibashi .................... | 380/201 |
| 6,041,316 A | * | 3/2000 | Allen .......................... | 705/52 |

FOREIGN PATENT DOCUMENTS

| | | | | |
|---|---|---|---|---|
| EP | 0 581137 A2 | * | 2/1994 | ............ G07D/7/00 |
| WO | 99/55089 | * | 10/1999 | ............ H04N/7/167 |
| WO | WO 99/55089 | * | 10/1999 | ............ H04N/7/167 |

OTHER PUBLICATIONS

Menezes, Handbook of Applied Cryptography, 1996, CRC Press, p. 21.*
Schneier, Bruce, Applied Cryptography 1996, John Wiley and Sons, Inc., $2^{nd}$ed., pp. 9–10, 15–17, 173, and 369.*
Menezes, Handbook of Applied Cryptography 1996, CRC Press, pg. 46.*

* cited by examiner

*Primary Examiner*—Douglas J. Meislahn
(74) *Attorney, Agent, or Firm*—Beyer, Weaver & Thomas, LLP.

(57) ABSTRACT

A method and system are disclosed for adjusting the resolution or performance of digital media in a reversible manner. A mask component having a length of a predetermined number of bits is extracted from a high-resolution ordinal component of digital data having an initial state. Another non-ordered, randomly generated second component having the same predetermined number of bits is received. A logic operation using the mask component and the second, non-ordered component is performed thereby deriving a third component also having the same predetermined number of bits. The high-resolution ordinal component of digital data is altered using the derived third component, thereby adjusting the initial state of the high-resolution ordinal component to a secondary state that can be reverted to its initial state by virtue of the logic operation being reversible given the correct, corresponding operands.

34 Claims, 6 Drawing Sheets

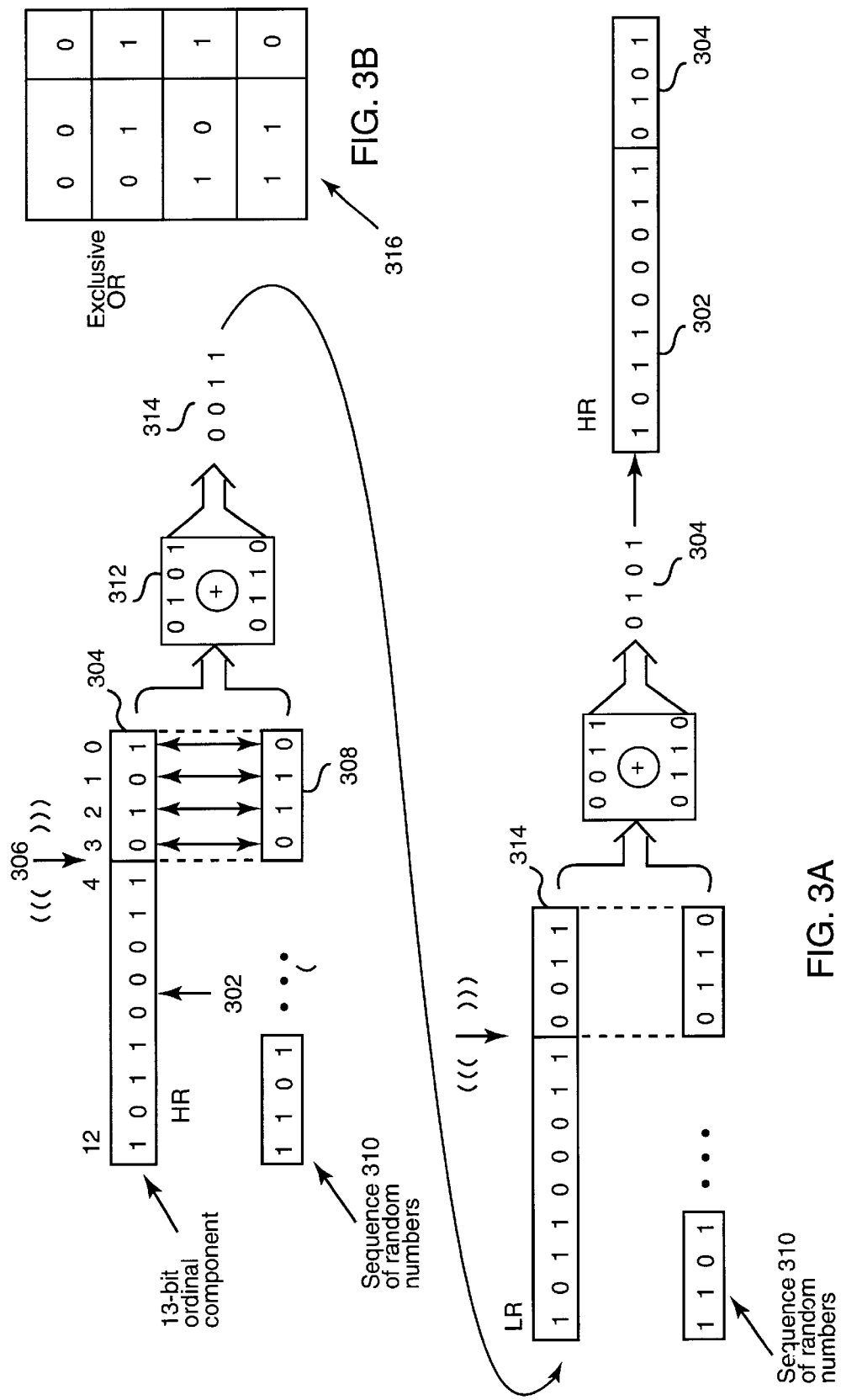

METHOD AND APPARATUS FOR ADJUSTING THE QUALITY OF DIGITAL MEDIA

BACKGROUND OF THE INVENTION

1. Field of the Invention

The present invention relates generally to computer software for manipulating transient digital data. More particularly, the invention relates to techniques for manipulating the grade or resolution of data before and after the data is transmitted or downloaded.

2. Discussion of Related Art

Over the past several years, the market for entertainment and information in digital format, most commonly digital images, audio, and video, has been growing rapidly. This market is manifested in many different ways, such as compact discs for storing music or video games, laser discs for storing movies, or floppy disks for storing photographs from digital cameras, to name a few examples. In the commercial entertainment and information service fields, it is often desirable to provide samples or previews of the entertainment or information being offered for sale to prospective customers. For example, presently, music stores allow customers to listen to typically short passages of songs before deciding whether to purchase the album. The sound quality of these passages are the same or very close to the sound quality of the recording the customer would purchase. In another example, in the context of "pay per view" for viewing movies through cable TV at home, previews of the movies can be seen at home before paying to watch the entire movie. Similar examples can be found in the information service industry where customers are given a sample of the information they would receive. In all these cases, the grade or resolution of the data presented to the user or customer is of the same grade as the data or information that would ultimately be used by the customer. The value to the customer in these preview or demonstration contexts is limited solely by the portion of the data received. It is typically too short to be of any entertainment or otherwise useful value to the customer. This type of sampling or demonstration to prospective customers or users of data, whether for information or entertainment, is limiting and not always satisfactory or the most desirable way to "try out" the data. Often, users want to see or hear a larger portion of the data before deciding to commit to it. Evaluating a larger work (such as an entire CD, video game, or movie) adequately is sometimes not possible from sampling a small portion of it. However, it is difficult for creators of the data to provide larger portions of the data at the same grade or quality of the original without the risk of losing market value of the original, full-length, high-resolution version. Presently, in many cases, and likely more so in the future, users want to "sample" larger portions of a given work or service, or even an entire work, before purchasing or subscribing to it. One way to allow this is to manipulate the underlying digital format of the data, as opposed to simply providing a short sample of the unaltered digital data.

One method of altering the underlying digital format of data is known as stenography. Stenography, a method well known in the field of cryptography is a way to place additional, typically hidden, data into a signal that can later be extracted. The additional data in the signal is meaningful to those who are aware of it and know how to extract it. The signal itself is also apparently meaningful in that it is not simply scrambled or random data.

However the real value in the apparent signal is its role as a "cover" for the hidden or additional data. Typically, the additional data is stored or bidden in the low end of the signal being transmitted. HG. 1 is a block diagram illustrating one manifestation of stenography. A video image 10 is made up of thousands of pixels, a representative pixel 12, having an RGB (red green blue) value. The RGB values for pixel 12 are shown as red value bits 14, green value bits 16, and blue value bits 18. In the example shown each value has 24 bits. It is possible to alter the low end bits 20 in each of the values without significantly affecting the overall value. For example, the lowest six bits in the red value can be altered without significantly changing the basic red shading or color of pixel 12. The same is true for the blue and green values. Using stenography, a sender can replace the low-end bits in values 14, 16, and 18 with data having no relationship with image 10, but when extracted and reconstructed form an unrelated video image 22. Although this process will alter video image 10 slightly, it can be adjusted (e.g. the lowest four bits or two bits can be used) so that the human eye is unable to detect the change or somewhat inferior resolution. Thus, using stenography, a sender can insert a hidden image in a larger image and a receiver, aware of the hidden image, can use digital image processing techniques to extract the hidden image (i.e. know which low end bits of the RGB values to separate). That is' the intended receiver knows that there is a hidden message or image, and knows how to extract it from the signal. Similar methods can be used to send hidden audio messages in a digital audio stream, such as on a compact disc, or a series of images in a digital video stream. Another method of altering digital data is widely known as JPEG. JPEG is an algorithm and a collection of facilities that take a digital image and compress it by collapsing redundant data. However, neither JPEG or stenography alters digital data by purposefully degrading the quality of the signal so as not to effect the value of the high grade version of the signal. As can be drawn from the description above, stenography is generally used to send a hidden meaningful signal within another, at least superficially, meaningful signal. JPEG alters data by compressing it so that it can be sent faster and more efficiently, or stored using less memory.

Therefore, it would be desirable to have a technique for purposefully downgrading the quality of a signal without diminishing its usefulness for demonstration or other purposes, and allowing the recipient to easily upgrade the signal to its original quality if desired. It would also be desirable to micro-adjust the downgrading of the signal to suit different contexts and needs, and similarly fine tune the upgrading of the downgraded signal if a quality somewhat lower than the original grade is desired.

SUMMARY OF THE INVENTION

To achieve the foregoing, and in accordance with the purpose of the present invention, methods, apparatus, and computer readable media are disclosed that adjust the quality or performance of digital media in a reversible manner. In one aspect of the present invention, a method of adjusting the resolution of digital data is described. A mask component having a length of a predetermined number of bits is extracted from a high-resolution ordinal component of digital data having an initial state. Another non-ordered second component having the same predetermined number of bits is received. A logic operation using the mask component and the second, non-ordered component is performed thereby deriving a third component also having the same predetermined number of bits. The high-resolution ordinal component of digital data is altered using the derived third component, thereby adjusting the initial state of the high-resolution ordinal component to a secondary state.

In one embodiment the mask component is re-altered partly or entirely to its original form by performing a logic operation on all or fewer than the predetermined number of bits in the third component and another non-ordered component. The second non-ordered component has a length equal to or less than the predetermined number of bits. This allows the altered ordinal component to revert to a secondary state closer to or the same as the initial state of the high-resolution ordinal component. In another embodiment, the second non-ordered component is generated from a pseudo-random number generator.

In another aspect of the present invention, a method of adjusting the quality of digital media having multiple bits is described. A random number is obtained and then used to alter a portion of the multiple bits in the digital media. This is done by performing an exclusive OR operation using as operands the random number and the portion of the multiple bits thereby deriving an altered segment of bits. This altered segments of bits is used to replace the original portion of the multiple bits thereby adjusting the quality of the digital media.

In one embodiment the random number and the altered segment of bits are used as operands to another exclusive OR operation to derive the original portion of multiple bits used as an operand in the first exclusive OR operation. The derived original portion of multiple bits is used to replace the altered segment thereby readjusting the quality of the digital media to a level closer or equal to its original level of quality or resolution. In another embodiment, the second exclusive OR operation is inputted a shorter subsegment of the random number and a subsegment, of the same length, of the altered segment, thereby allowing a partial upgrade in the quality of the resolution of the digital media.

In another aspect of the present invention, a system for adjusting the resolution of a transient digital data stream is disclosed. The system includes a bit segment extractor that extracts a first portion of bits from a first component of the digital media wherein the first portion has a pre-selected number of bits and the first component has an initial resolution level. A data generator creates a second component of non-ordered or random data having the same number of pre-selected bits. An arithmetic logic unit performs an initial logic operation using the first portion and the second component. This logic operation derives a third component having the same number of pre-selected bits. A data component and segment manipulator alters the first component of the transient digital data stream using the third component wherein the initial state of the first component is adjusted to a secondary, lower resolution state. In one embodiment a second arithmetic logic unit performs another logic operation on all or fewer than the first pre-selected number of bits in the third component and a fourth component of non-ordered data also having a length equal to or less than the first pre-selected number of bits. A receiving data component manipulator reverts the first component where the secondary, lower resolution state of the first component is upgraded to be closer to the transient digital data stream's initial state. In another embodiment an initial random number generator generates the second component of non-ordered digital data. In yet another embodiment, the second arithmetic logic unit performs an exclusive OR operation between bits in the third component and bits in the fourth component of non-ordered data.

In other aspects of the present invention, computer readable media containing programmed instructions arranged to adjust the resolution and quality of a transient data stream representing digital media are disclosed. In yet other aspects of the present invention, computer data signals embodied in a carrier wave and representing sequences of instructions for adjusting the resolution and quality of a transient data stream representing digital media are disclosed.

BRIEF DESCRIPTION OF THE DRAWINGS

The invention may best be understood by reference to the following description taken in conjunction with the accompanying drawings in which:

FIG. 3a is a schematic diagram showing a process of downgrading and upgrading a transient data stream in accordance with one embodiment of the present invention.

FIG. 3b shows a table illustrating the results of an exclusive OR operation.

DETAILED DESCRIPTION

Reference will now be made in detail to a preferred embodiment of the invention. An example of the preferred embodiment is illustrated in the accompanying drawings. While the invention will be described in conjunction with a preferred embodiment, it will be understood that it is not intended to limit the invention to one preferred embodiment. To the contrary, it is intended to cover alternatives, modifications, and equivalents as may be included within the spirit and scope of the invention as defined by the appended claims.

A method and system for purposefully downgrading an original high-grade signal to be stored or transmitted and, at a later time, restoring the downgraded signal to its original high-grade form is described in the various figures. As mentioned above, it would be desirable to be able to finely adjust the downgrading of a high-grade transient data stream so that the data stream can still be used by a recipient and, if desired, upgraded by the recipient to its original high-grade form. The present invention uses a pseudo-random number generator to generate a sequence of numbers based on a seed. Selected numbers from the sequence of pseudo-random numbers are then used in a logical operation with consecutive segments of the original data stream to produce an altered or downgraded data stream. The same or related seed and algorithm are used in another (or the same) pseudo-random number generator to generate the same sequence of numbers. This sequence of numbers is then used to upgrade the low-resolution transient data stream to the original high-resolution form or partially upgraded resolution form.

Figure 1:
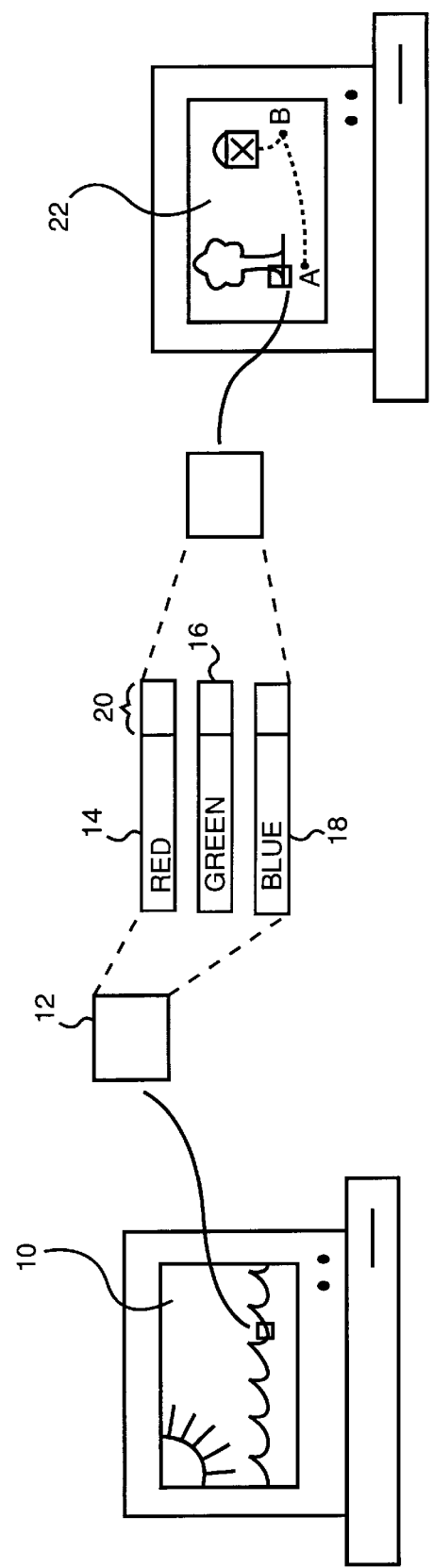
FIG. 1 is a block diagram illustrating one manifestation of stenography.
Figure 2:
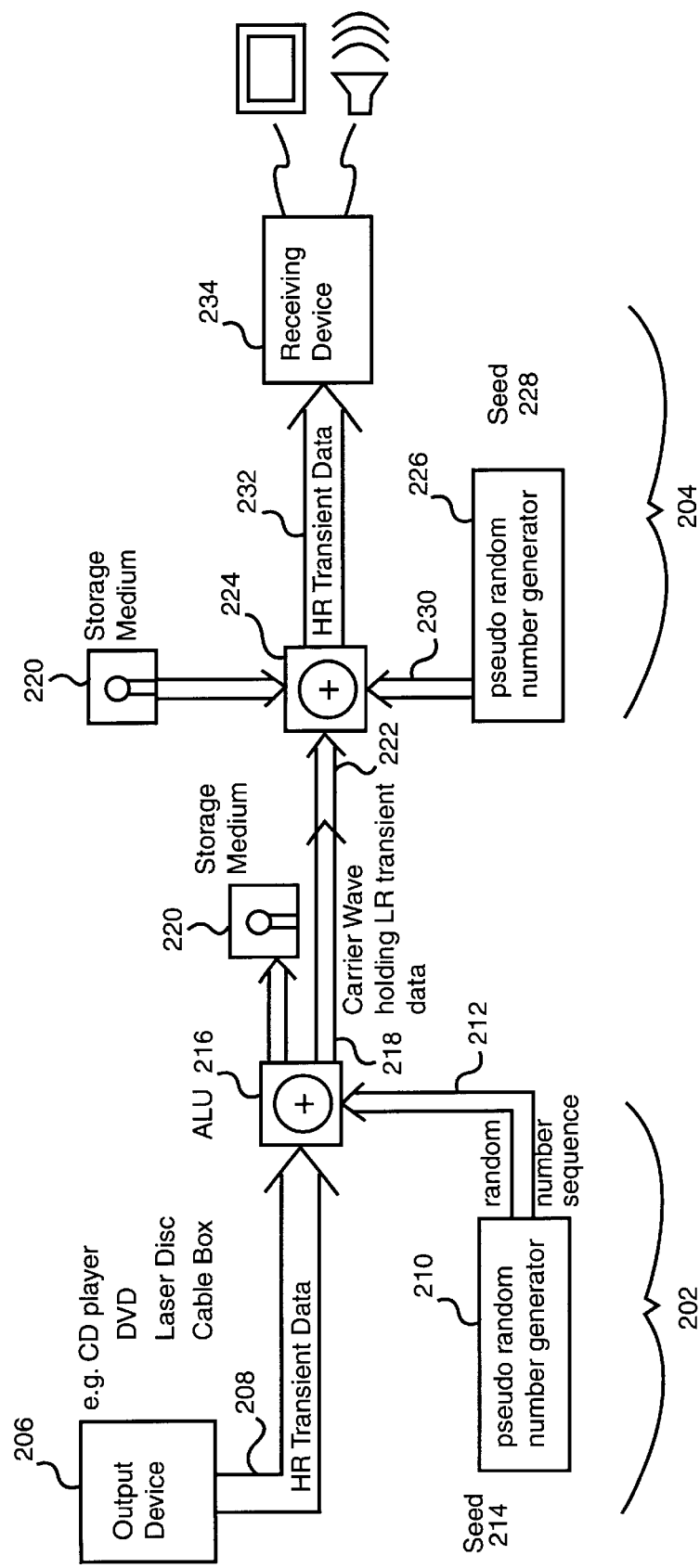
FIG. 2 is a block diagram showing components and data flow in a system for varying digital media resolution in accordance with one embodiment of the present invention.

FIG. 2 is a block diagram showing components and the flow of data in a system for varying digital media resolution in accordance with one embodiment of the present invention. In the described embodiment, the system and process for varying the resolution of transient, ordered digital data includes two general sections or sides: an originator end 202 and a receiver end 204. In another embodiment, the system and process includes only originator end 202 for downgrading a high-resolution data stream. In the described embodiment, originator end 202 includes an output device 206 which outputs a high-resolution (i.e. normal resolution) transient, ordered data stream 208 in which none of the bits are altered. Output device can be any device that outputs a transient stream of digital data that has some degree of order, such as a CD player, a digital video disc (')VD) player, a CD-ROM player, or a cable TV box with digital capabilities. Data stream 208 should typically have some degree of order in that the data stream collectively makes up a logical unit in which the order of the data is important, such as a piece of music, a video frame or line, a photograph, or human-readable information.

Another component of originator end 202 is a pseudo-random number generator 210. Pseudo-random number generator 210 is a widely used component for generating a sequence of numbers 212 that exhibit random behavior to an observer. Such a device is well known in various fields including the field of computer programming. Pseudo-random number generator 210 uses a particular value known as a seed 214 to generate a sequence of numbers. Generator 210 produces sequence of numbers 212 based on and/or beginning with seed 214, provided by the operator (e.g. the person sending or preparing the low-resolution transient data 208) or by the component using generator 210. For example, in the present invention, the originator or sender of transient, ordered data 208 can input seed 214 into pseudo-random number generator 206. Two generators that are given the same seed can produce the same sequence of numbers, if desired, as discussed in greater detail below. The rate at which the sequence of numbers is generated can be adjusted to meet the needs or rate of the component with which it is working, such as a CD or DVD player, or any other types of output device 206. Although in the described embodiment pseudo-random number generator 210 is shown as a separate logical component, it can be implemented in a various ways. For example, it can be implemented as a computer program and can reside on any electronic device having a microprocessor, such as a client or server computer, a CD or DVD player, or a cable TV box, to name a few examples. In another embodiment, generator 210 is a physically separate component that operates in conjunction with output device 206.

Random number sequence 212 and high-resolution transient data stream 208 are routed to an arithmetic logical unit (ALU) 216. In the described embodiment, ALU 216 is a program residing in a computer or an output device 206 having computing capabilities. ALU 216 performs an "exclusive OR" operation on a predetermined number of bits from portions (referred to below as ordinal components) of data stream 208 and bits from random number sequence 212. In the described embodiment, the predetermined number of bits from portions of data stream 208 is in the least significant bits (i.e. right-most) end of data stream 208. The exclusive OR operation transforms high4esolun.on transient data 208 to low-resolution data 218. This process is discussed in greater detail in FIGS. 3a and 3b.

Once low-resolution data 218 has been created, it can be saved on an appropriate storage medium 220, such as a floppy disk or CD-ROM, or can be transmitted to receiver end 204 via a carrier wave signal 222, for example, over a coaxial cable, telephone line, or fiber optic cable. Both these implementations are shown in FIG. 2. In either case, at receiver end 204 low-resolution data 218 is inputted into an ALU 224 similar to ALU 216 at originator end 202.

Similarly, a pseudo-random number generator 226, using a seed 228, outputs a random number sequence 230 that is inputted into ALu 224. In the described embodiment, number generator 226 and seed 228 have some relationship with number generator 210 and seed 214, but can be different depending on the algorithms used to create the pseudo-random numbers in generators 210 and 226. These relationships are discussed in greater detail in FIGS. 3a, 4a, and 4b ALU 224 also performs an exclusive OR operation on certain least significant bits of low-resolution data 218 and a corresponding number of bits from pseudo-random number sequence 230, which matches pseudo-random number sequence 212.

In the described embodiment, high-resolution transient data stream 232 is outputted from ALU 224. Data stream 232 can be the same as data stream 208 if the same number of least significant bits are used in the exclusive OR operation with the same random number segment on both ends of the system.

In another embodiment, a smaller number of least significant bits are used in the exclusive OR operation with a corresponding number of random numbers from the same random number sequence 230. Through this operation, a transient data stream is obtained that has a higher resolution than transient data 218 but has a lower resolution than the original high-resolution data stream 208. The process for adjusting or calibrating the upgrade of low-resolution transient data 218 to a higher resolution is discussed in FIGS. 3a and 3b. High-resolution transient data 232 is inputted to a receiving device typically the same as output device 206, but can be different. For example, the output device can be a digital video recorder or digital camera and receiving device 234 can be a computer having a display monitor.

A system for varying digital media resolution shown in FIG. 2 can also be used to play or process low-resolution transient data 218 directly through receiving device 234. Thus, it is possible to have the low-resolution data sent to receiving device 234 without having the data upgraded first. This eliminates the need for pseudo-random number generator 226 and ALU 224. It allows a recipient, such as a potential customer or subscriber, sample a low-resolution version of an original high-resolution data stream. Should the receiver later want the original high-resolution version, or something close to it, he can install or invoke (if already resident) a program to implement the logic in ALU 224 and begin generating random numbers from number generator 226 using a seed provided by the originator (or seller).

FIG. 3a is a schematic diagram showing a process of downgrading and upgrading a transient data stream in accordance with one embodiment of the present invention. High-resolution transient data stream 208 of FIG. 2 is partitioned into ordinal components of a certain length. The length of an ordinal component depends on the type of data. By way of example, a video image is typically partitioned by pixel 15 where each pixel has a red, green, and blue component, each of which is typically in the range of 24 or 32 bits. Music data on a CD can typically be partitioned into ordinal components in the range of 16 bits. A 13-bit ordinal component 302 is shown in FIG. 3a. For the purposes of illustration, a 4-bit mask is used to downgrade ordinal component 302. The mask is the portion of the ordinal component that is used in the exclusive OR operation. In the described embodiment, the mask begins with the least significant bits in the ordinal component. This is preferable because the downgrading of the original high-resolution data stream is better accomplished by affecting the least significant bits. Altering the more significant bits may cause more pronounced changes than is typically desired.

Bits zero to three (0 1 0 1) are used as mask 304. The number of bits used for mask 304 can be adjusted as indicated by arrow 306. The more bits used in the mask, the lower the resolution. On the other hand, if only one or two bits are used in the mask, the degradation in resolution may be negligible, depending on the length of the ordinal component. A four-bit pseudo-random number 308 (0 1 1 0) from a sequence of numbers 310 is used as one operand in an exclusive OR operation 312. The other operand is four-bit mask 304 from ordinal component 302. The two four-bit values undergo an exclusive OR operation from which is outputted a result 314 (0 0 11). FIG. 3b shows a table 316 illustrating the results of an exclusive OR operation: if two bits are the same, the result is a zero, if they are different, the result is a one. The unique characteristic of the exclusive OR operation is that it is reversible. That is, original mask 304 (0 1 0 1) can be recovered by using the exclusive OR operation on result 314 and the same pseudo-random number 308.

Result 314 replaces bits zero to three of ordinal component 302 to form a low-resolution ordinal component 318. It is useful to note here that ordinal components 302 and 318 are part of a longer transient data stream. As described above, the low-resolution transient data stream (218 of FIG. 2) can be saved on a tangible storage medium or can be transmitted directly to a receiver. In either case, at the receiver end, in the described embodiment, the same sequence of pseudo-random numbers 310 is generated using the same seed that was used at the originator end. To upgrade the low-grade resolution ordinal component, the exclusive OR operation with operands bits zero to three (i.e. result 314) and the same pseudo-random number 308 are used. The exclusive OR operation results in the original least significant bits (0 1 0 1) of high-grade ordinal component 302. These original least significant bits replace result 314 to form the original high-grade ordinal component 302.

In another embodiment, a smaller portion of the mask that was altered at the originator end can be upgraded at the receiver end to obtain a transient data stream that is "medium" grade resolution should such a data stream be desired. For example, only bits three and two can be upgraded thereby leaving bits one and zero in the low-grade form. In this case, the same sequence of bits would be emitted by the pseudo-random number generator at the receiver end.

However, only two-bit random numbers corresponding to bits two and three of ordinal component 302 would be used as an operand in the exclusive OR operation. This would result in those two bits being upgraded to the original high-grade bits and bits zero and one remaining downgraded (i.e. 0 111).

Figure 4A:
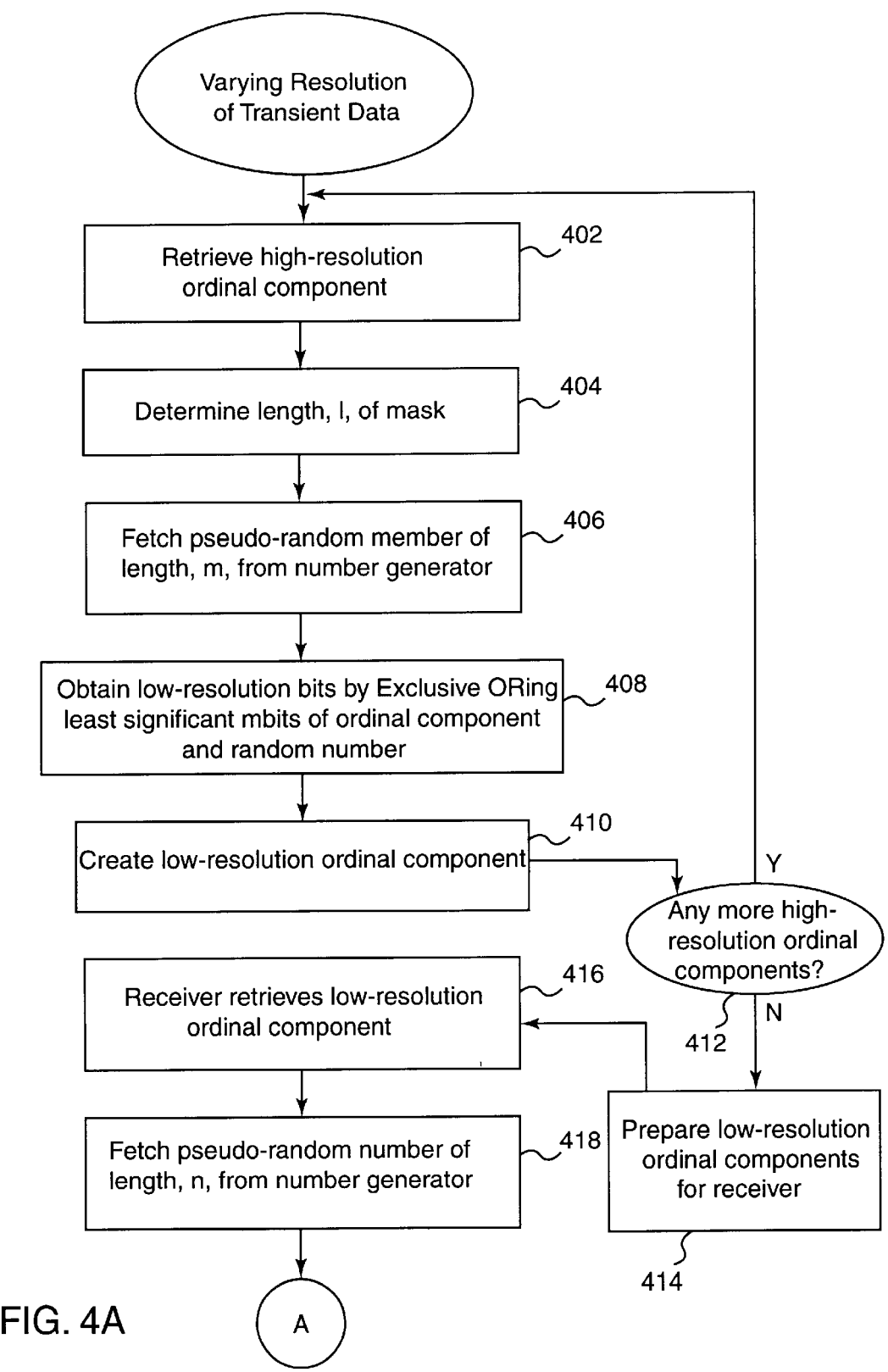
FIGS. 4a and 4b are flow diagrams showing a process of varying the resolution of a digital transient data stream in accordance with one embodiment of the present invention.
Figure 4B:
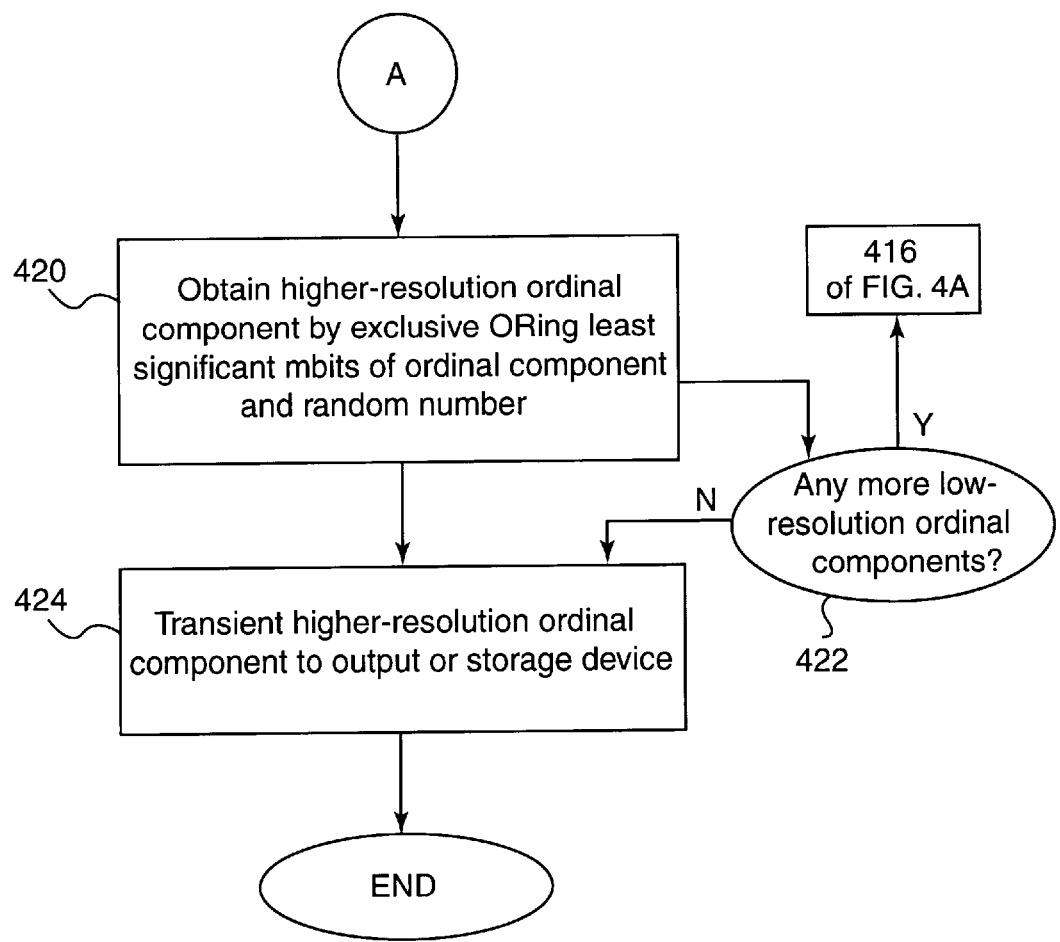

FIGS. 4a and 4b are flow diagrams showing a process of varying the resolution of a digital transient data stream in accordance with one embodiment of the present invention. It describes in greater detail processes shown in FIG.

At step 402 a normal, high-resolution ordinal component is retrieved from a longer, ordered, transient data stream. The length of the ordinal component will vary depending on the type of media represented by the transient data stream.

The originator or sender typically determines the length of the mask that will be used to downgrade the high-resolution ordinal component. In the described embodiment, the length is measured in number of bits and is typically the bits at the least significant end of the ordinal component. The length of the mask can depend on how far the sender wants to be able to downgrade the ordinal component and the length of the ordinal component itself. A length, 1, of the mask is determined at step 404.

At step 406 the program fetches a pseudo-random number, also of length 1, from a pseudo-random number generation The number generator can be a functional component in the digital resolution-varying program, a component in the device providing the ordinal component (e.g. a CD player or a cable TV box), or be a separate unit. The pseudo-random number is generated using a particular seed that is inputted into the random number generator that, in turn, generates a sequence of random numbers from which a number, or segment, also of length 1, is extracted.

At step 408, altered bits, also of length 4 are created by performing an exclusive OR operation using as operands the pseudo-random number and the mask portion of the ordinal component. The exclusive OR operation, as described in FIGS. 3a and 3b, creates a string of bits that can be used as an operand in a subsequent exclusive OR operation to retrieve the original mask portion of the ordinal component.

At step 410 the altered bits replace the bits in the original mask portion of the ordinal component, thereby creating a decreased or lowered grade version of the original high-resolution ordinal component retrieved at step 402. At step 412 the program checks whether there are any remaining ordinal components in the transient digital stream. For example, does the present ordinal component represent the last pixel in a digital image or the last byte in a song on a CD. If the present ordinal component is not the last, control returns to step 402 where the next ordinal component is retrieved and the process is repeated. If it is the last ordinal component, the program prepares all the low-resolution ordinal components that have been created for transport to a receiver.

As mentioned above, the low-resolution data can be provided to a receiver in various ways. One of the more frequent ways this can be done is placing the low-resolution data on a tangible medium, such as a floppy disk, a CD-ROM, a compact disc, a magnetic tape, a portable hard drive, or a digital audio tape ([)AT), to name a few examples. Another way is to transmit the data in a carrier wave over some type of transmission line, such as a coaxial cable, telephone line, or fiber optic cable. Other ways, such as wireless methods of transmitting the data can also be employed to get the low-resolution data to a receiver.

At step 416 a receiver, such as a potential customer, retrieves a low-resolution ordinal component from whatever transport media was used by the sender. The length of the ordinal component is the same as the length of the high-resolution ordinal component retrieved at step 402. Once retrieved, the receiver can either use (i.e. play, view, read, etc.) all the ordinal components that make up the longer transient data stream in its low-grade form or upgrade the data. For example, if the receiver is a potential customer, he might want to listen to or watch the digital data in its low-resolution form first for free or a reduced price before deciding to purchase the high-resolution form.

If the receiver decides to upgrade the low-resolution transient data stream, the same or similar digital resolution-varying program that ran on the sender's side, now running on the receiver side, retrieves a pseudo-random number having a length of n bits from a pseudo-random number generator at step 418. The number of bits n can be equal to or less than 1, mentioned above in step 404, and depends on the degree of upgrading desired. In the described embodiment, the pseudo-random number generator used on the receiver end uses an algorithm and seed similar to or the same as those used on the originator end. This is so because the program on the receiver end needs the same sequence of random numbers that was generated on the originator end. In the seller-customer context, a seller can provide the customer with a pseudo-random number generator and a seed that can be used to upgrade a low-resolution demonstration version of the digital data.

At step 420 the resolution-varying program on the receiver end performs an exclusive OR operation using as operands the pseudo-random number obtained at step 418 and the altered bits portion of the ordinal component. Because of the reversible property of the exclusive OR operation, the original high-resolution bits of the ordinal component are recovered. This is shown in greater detail in FIG. 3a. Once the original high-resolution bits are recovered, they are used to replace the altered bits in the low-resolution ordinal component.

In another embodiment, less than all the altered bits are reverted or upgraded to their original values thereby providing a medium-grade version of the transient data stream. By upgrading only a certain number of the altered bits, a sender or receiver can calibrate the quality level of the digital media. For example, only half of the altered bits can be used as one operand to the exclusive OR operation (typically the most significant, or the left-most bits, of the altered portion are reverted leaving the least significant bits of the altered portion the same). If this is done, the number of bits in the random number used as an operand in the exclusive OR operation must be changed to watch the number of bits reverted in the altered portion of the low-resolution ordinal component. However, this does not change the requirement that the same sequence of pseudo-random numbers is needed for the exclusive OR operation. It only changes which segments (i.e. how many bits to skip before starting a new segment) and the number of bits in the segments that are used as operands.

At step 422 the program checks whether there are any remaining low-resolution ordinal components. If there are, control returns to step 416 where the next ordinal component is retrieved. If the last component has been retrieved, the set of upgraded ordinal] components that makes up the transient data stream representing the digital media is sent to a receiving device or storage media at step 424. The receiving device can, in turn, be connected to an outlet, such as speakers, a television screen, or a display monitor. At this stage the process of varying the resolution of a transient, ordered data stream is complete.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, extracting, producing, identifying, running, determining, comparing, executing, downloading, or detecting. It is sometimes convenient, principally for reasons of common usage, to refer to these electrical or magnetic signals as bits, values, elements, variables, characters, data, or the like. It should be remembered, however, that all of these and similar terms are to be associated with the appropriate physical quantities and are merely convenient labels applied to these quantities.

The present invention also relates to devices, systems or apparatus for performing the aforementioned operations. A system can be specially constructed for the required purposes, or it can be a general purpose computer selectively activated or configured by a computer program, such as the resolution-varying computer program, stored in the computer. The processes presented above are not inherently related to any particular computer or other computing apparatus. In particular, various general purpose computers can be used with programs written in accordance with the teachings herein, or, alternatively, it may be more convenient to construct a more specialized computer system to perform the required operations, such as generating the described pseudo-random numbers.

Figure 5:
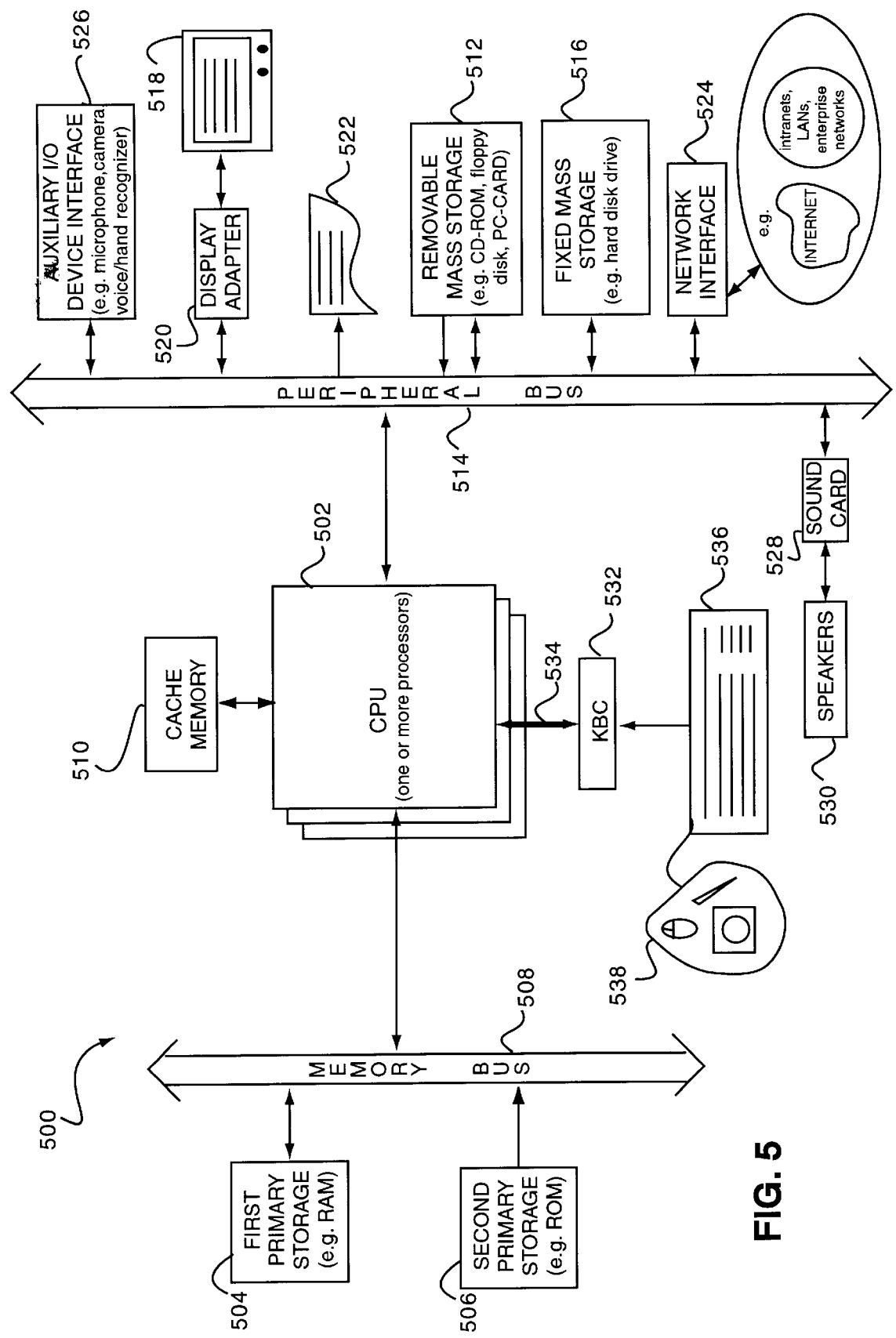
FIG. 5 is a block diagram of a typical computer system suitable for implementing an embodiment of the present invention.

FIG. 5 is a block diagram of a general purpose computer system 500 suitable for carrying out the processing in accordance with one embodiment of the present invention. HG. 5 illustrates one embodiment of a general purpose computer system. Other computer system architectures and configurations can be used for carrying out the processing of the present invention. Computer system 500, made up of various subsystems described below, includes at least one microprocessor subsystem (also referred to as a central processing unit, or CPU) 502. That is, CPU 502 can be implemented by a single-chip processor or by multiple processors. CPU 502 is a general purpose digital processor which controls the operation of the computer system 500. Using instructions retrieved from memory, the CPU 502 controls the reception and manipulation of input data, and the output and display of data on output devices.

CPU 502 is coupled bi-directionally with a first primary storage 504, typically a random access memory (RAM), and uni-directionally with a second primary storage area 506, typically a read-only memory (ROM), via a memory bus 508. As is well known in the art, primary storage 504 can be used as a general storage area and as scratch-pad memory, and can also be used to store input data and processed data. It can also store programming instructions and data, in the form of segments or portions of bits taken from longer, sequences of bits, such as transient data streams or random data streams. This is in addition to other data and instructions for processes operating on CPU 502, and is used typically for fast transfer of data and instructions in a bi-directional manner over the memory bus 508. Also, as well known in the art, primary storage 506 typically includes basic operating instructions, program code, data and objects used by the CPU 502 to perform its functions. Primary storage devices 504 and 506 may include any suitable computer-readable storage media, described below, depending on whether, for example, data access needs to be bi-directional or uni-directional. directional. CPU 502 can also directly and very rapidly retrieve and store frequently needed data in a cache memory 510.

A removable mass storage device 512 provides additional data storage capacity for the computer system 500, and is coupled either bi-directionally or uni-directionally to CPU 502 via a peripheral bus 514. For example, a specific removable mass storage device commonly known as a CD-ROM typically passes data uni-directionally to the CPU 502, whereas a floppy disk can pass data bi-directionally to the CPU 502. Storage 512 may also include computer-readable media such as magnetic tape, flash memory, signals embodied on a carrier wave, Smart Cards, portable mass storage devices, holographic storage devices, and other storage devices. A fixed mass storage 516 also provides additional data storage capacity and is coupled bi-directionally to CPU 502 via peripheral bus 514. The most common example of mass storage 516 is a hard disk drive. Generally, access to these media is slower than access to primary storages 504 and 506. Mass storage 512 and 516 generally store additional programming instructions, data, and the like that typically are not in active use by the CPU 502. It will be appreciated that the information retained within mass storage 512 and 516 may be incorporated, if needed, in standard fashion as part of primary storage 504 (e.g. RAM) as virtual memory.

In addition to providing CPU 502 access to storage subsystems, the peripheral bus 514 is used to provide access other subsystems and devices as well. In the described embodiment, these include a display monitor 518 and adapter 520, a printer device 522, a network interface 524, an auxiliary input/output device interface 526, a sound card 528 and speakers 530, and other subsystems as needed.

The network interface 524 allows CPU 502 to be coupled to another computer, computer network, or telecommunications network using a network connection as shown. Through the network interface 524, it is contemplated that the CPU 502 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 502 can be used to connect the computer system 500 to an external network and transfer data according to standard protocols. That is, method embodiments of the present invention may execute solely upon CPU 502, or may be performed across a network such as the Internet, intranet networks, or local area networks, in conjunction with a remote CPU that shares a portion of the processing. Additional mass storage devices (not shown) may also be connected to CPU 502 through network interface 524.

Auxiliary 110 device interface 526 represents general and customized interfaces that allow the CPU 502 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 502 is a keyboard controller 532 via a local bus 534 for receiving input from a keyboard 536 or a pointer device 538, and sending decoded symbols from the keyboard 536 or pointer device 538 to the CPU 502. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data that can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the present invention can include additional or fewer subsystems. In addition, memory bus 508, peripheral bus 514, and local bus 534 are illustrative of any interconnection scheme serving to link the subsystems. For example, a local bus could be used to connect the CPU to fixed mass storage 516 and display adapter 520. The computer system shown in FIG. 5 is but an example of a computer system suitable for use with the invention. Other computer architectures having different configurations of subsystems may also be utilized.

Although the foregoing invention has been described in some detail for purposes of clarity of understanding, it will be apparent that certain changes and modifications may be practiced within the scope of the appended claims. Furthermore, it should be noted that there are alternative ways of implementing both the process and apparatus of the present invention. For example, the pseudo-random number generator can be a separate unit or a functional module in the resolution-varying program, or can reside on the output or receiving device. In another example, only a portion of the altered bits in the low-resolution data stream is upgraded to its original form thereby creating a medium-grade data stream, if desired. Accordingly, the present embodiments are to be considered as illustrative and not restrictive, and the invention is not to be limited to the details given herein.

What is claimed is:

1. A method of adjusting resolution of digital data having a first resolution, the method comprising:

extracting a first portion having a length of a first predetermined number of least significant bits from a first component of the digital data, the first component having a primary state, the predetermined number being based upon a desired level of resolution adjustment of the digital data;

receiving a second component of non-ordered digital data having a length of the first predetermined number of least significant bits;

performing a first logic operation using the first portion and the second component thereby deriving a third component having a length of the first predetermined number of least significant bits; and altering the first component of the digital data using the third component whereby the primary state of the first component is adjusted to a secondary state and as a result of the altering the resolution of digital data is adjusted to a second resolution that is different from the first resolution.

2. The method of claim 1, further comprising re-altering the first component by performing a second logic operation on all or fewer than the first predetermined number of bits in the third component and a fourth component of non-ordered data having a length equal to or less than the first predetermined number of bits, whereby the secondary state of the first component is adjusted to be closer to the primary state and as a result of the re-altering the resolution of data is re-adjusted from the second resolution to be closer to the first resolution.

3. A method as recited in claim 1 wherein the first component of digital data is part of a transient data stream.

4. A method as recited in claim 3 wherein the transient data stream contains ordered data.

5. A method as recited in claim 1 further comprising generating the second component of non-ordered digital data from a first pseudo random number generator.

6. A method as recited in claim 5 further comprising using a first seed value in the first pseudo-random number generator to generate a first sequence of pseudo-random numbers from which the second component of non-ordered digital data is extracted.

7. A method as recited in claim 1 wherein performing a first logic operation further comprises performing an exclusive OR operation between the bits in the first portion and the bits in the second component.

8. A method as recited in claim 2, wherein performing a second logic operation further comprises performing an exclusive OR operation between the bits in the third component and the bits in the fourth component of non-ordered data.

9. A method as recited in claim 8 further comprising generating the fourth component of non-ordered data from a second pseudo-random number generator.

10. A method as recited in claim 9, further comprising using a second seed in the second pseudo-random number generator to generate a second sequence of pseudo-random numbers from which the fourth component is extracted.

11. A method as recited in claim 8 wherein performing an exclusive OR operation further comprises using fewer than the first predetermined number of least significant bits in the third component and fewer than the first predetermined number of bits in the fourth component of non-ordered data.

12. A method as recited in claim 1 wherein altering the first component of the digital data further comprises replacing the first portion with the third component.

13. A method as recited in claim 12 wherein the bits in the first portion of the first component, the first component having a plurality of bits, are the least significant bits of the plurality of bits of the first component.

14. A system for adjusting resolution of digital data having a first resolution, the system comprising:
a bit segment extractor for extracting a first portion from a first component of the digital data wherein the first portion has a length of a first predetermined number of least significant bits and the first component has a primary state, the predetermined number being based upon a desired level of resolution adjustment of the digital data;
a data generator for creating a second component of non-ordered digital data having a length of the first predetermined number of least significant bits;
an arithmetic logic unit for performing a first logic operation using the first portion and the second component wherein a third component is derived having a length of the first predetermined number of least significant bits; and
a data component manipulator for altering the first component of the digital data using the third component wherein the primary state of the first component is adjusted to a secondary state, thereby adjusting the resolution of digital data from the first resolution to a second resolution that is different than the first resolution.

15. A system as recited in claim 14 wherein the arithmetic logic unit performs an exclusive OR operation between the bits in the first portion and the bits in the second component.

16. A system as recited in claim 14 further comprising:
a receiving arithmetic logic unit for performing a second logic operation on all or fewer than the first predetermined number of least significant bits in the third component and a fourth component of non-ordered data having a length equal to or less than the first predetermined number of least significant bits; and
a receiving data component manipulator for re-altering the first component wherein the secondary state of the first component is adjusted to be closer to the primary state.

17. A system as recited in claim 16 wherein the receiving arithmetic logic unit performs an exclusive OR operation between the bits in the third component and the bits in the fourth component of non-ordered data.

18. A system as recited in claim 17 further comprising:
a second pseudo-random number generator for generating the fourth component of non-ordered data.

19. A system as recited in claim 14 wherein the data component manipulator for altering the first component of the digital data replaces the first portion with the third component.

20. A system as recited in claim 14 further comprising:
a first pseudo-random number generator for generating the second component of non-ordered digital data.

21. A system for adjusting the quality of digital media having a plurality of bits; the system comprising:
a random number generator for generating a random number; and
a data bit manipulator for altering an original portion of the plurality of bits in the digital media using the random number, the original portion comprising a predetermined number of least significant bits, the predetermined number being based upon a desired level of quality adjustment of the digital media, wherein an exclusive OR operator using as operands the random number and the original portion of the plurality of bits derives an altered segment, and wherein the original portion of the plurality of bits is replaced with the altered segment thereby adjusting the quality of the digital media.

22. A system as recited in claim 21 further comprising:
a receiving data bit manipulator for altering the altered segment of the plurality of bits in the digital media using the random number, wherein a secondary exclusive OR operator using as operands the random number and the altered segment derives the original portion of the plurality of bits, and wherein the altered segment is replaced with the original portion of the plurality of bits thereby readjusting the quality of the digital media.

23. A system as recited in claim 22 wherein the secondary exclusive OR operator accepts as operands a random number segment having a specific number of bits of the random number and a subsegment of the altered segment, the subsegment having the specific number of bits.

24. A computer readable medium containing programmed instructions arranged to adjust resolution of digital data having a first resolution, the computer readable medium including programmed instructions for:
extracting a first portion having a length of a first predetermined number of least significant bits from a first component of the digital data, the first component having a primary state, the predetermined number being based upon a desired level of resolution adjustment of the digital data;
receiving a second component of non-ordered digital data having a length of the first predetermined number of least significant bits;

performing a first logic operation using the first portion and the second component thereby deriving a third component having a length of the first predetermined number of least significant bits; and altering the first component of the digital data using the third component whereby the primary state of the first component is adjusted to a secondary state and as a result of the altering the resolution of digital data is adjusted from the first resolution to a second resolution that is different than the first resolution.

25. A computer readable medium as recited in claim 24 further comprising programmed instructions for:

re-altering the first component by performing a second logic operation on all or fewer than the first predetermined number of least significant bits in the third component and a fourth component of non-ordered data having a length equal to or less than the first predetermined number of least significant bits whereby the secondary state of the first component is adjusted to be closer to the primary state.

26. A computer readable medium as recited in claim 25 wherein the programmed instructions for performing a second logic operation further comprises programmed instructions for performing an exclusive OR operation between the bits in the third component and the bits in the fourth component of non-ordered data.

27. A computer readable medium as recited in claim 26 further comprising programmed instructions for generating the fourth component of non-ordered data from a second pseudo-random number generator.

28. A computer readable medium as recited in claim 26 wherein the programmed instructions for performing an exclusive OR operation further comprises programmed instructions for using fewer than the first predetermined number of least significant bits in the third component and fewer than the first predetermined number of least significant bits in the fourth component of non-ordered data.

29. A computer readable medium as recited in claim 24 wherein the programmed instructions for altering the first component of the digital data further comprises programmed instructions for replacing the first portion with the third component.

30. A computer readable medium as recited in claim 24 further comprising programmed instructions for generating the second component of non-ordered digital data from a first pseudo-random number generator.

31. A computer readable medium as recited in claim 24 further comprising programmed instructions for using a first seed value with the first pseudo-random number generator to generate a first sequence of pseudo-random numbers from which the second component of non-ordered digital data is extracted.

32. A computer readable medium as recited in claim 24 wherein the programmed instructions for performing a first logic operation further comprises programmed instructions for performing an exclusive OR operation between the bits in the first portion and the bits in the second component.

33. A computer data signal embodied in a carrier wave and representing sequences of instructions arranged to adjust resolution of digital data having a first resolution, the sequence of instructions comprising:

extracting a first portion having a length of a first predetermined number of least significant bits from a first component of the digital data, the first component having a primary state, the predetermined number being based upon a desired level of resolution adjustment of the digital data;

receiving a second component of non-ordered digital data having a length of the first predetermined number of least significant bits;

performing a first logic operation using the first portion and the second component thereby deriving a third component having a length of the first predetermined number of least significant bits; and altering the first component of the digital data using the third component whereby the primary state of the first component is adjusted to a secondary state and as a result the resolution of digital data is adjusted from a first resolution to a second resolution.

34. A computer data signal embodied in a carrier wave as recited in claim 33 further comprising sequences of instructions for:

re-altering the first component by performing a second logic operation on all or fewer than the first predetermined number of bits in the third component and a fourth component of non-ordered data having a length equal to or less than the first predetermined number of bits whereby the secondary state of the first component is adjusted to be closer to the primary state.

* * * * *